May 5, 1970 R. LANKIN 3,509,612
MILLING CUTTER AND BLADE ASSEMBLY
Filed June 16, 1969 2 Sheets-Sheet 1
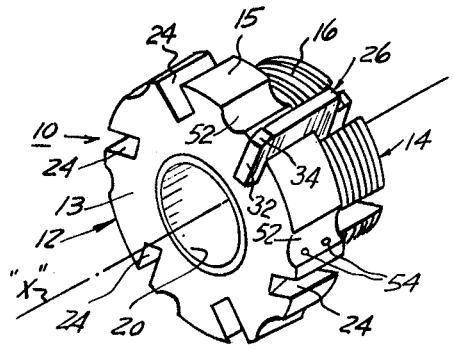
FIG. 1
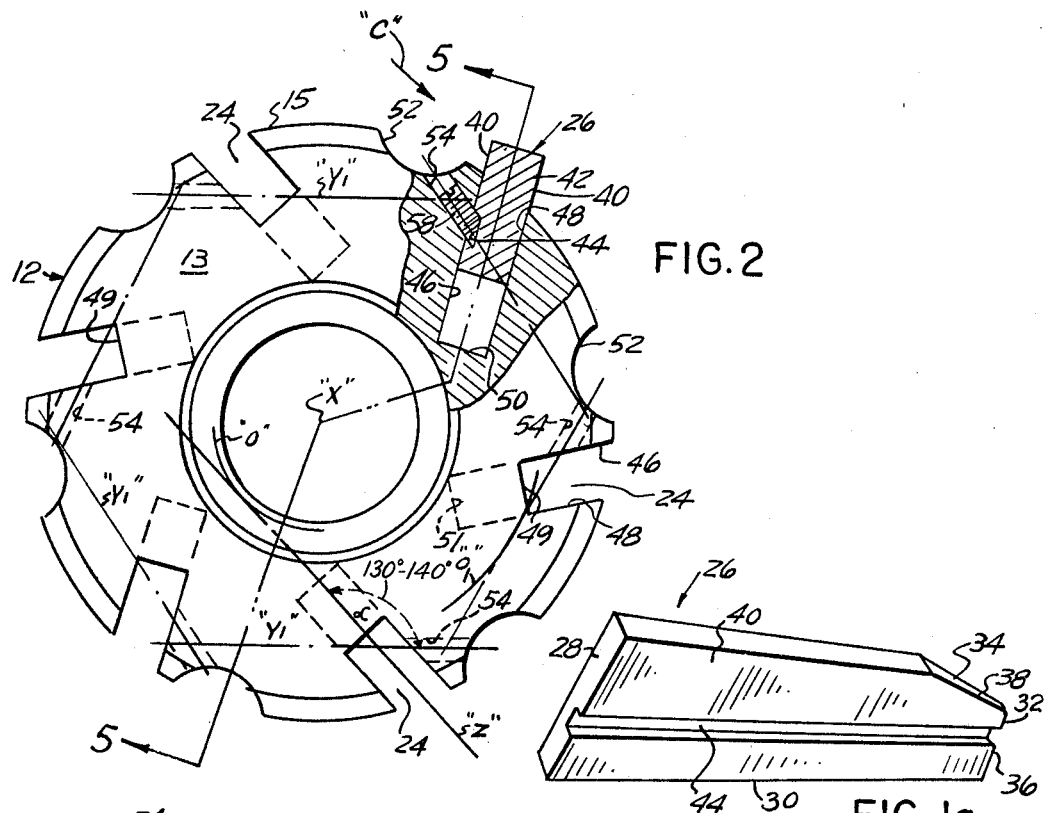
FIG. 2
FIG. 1a
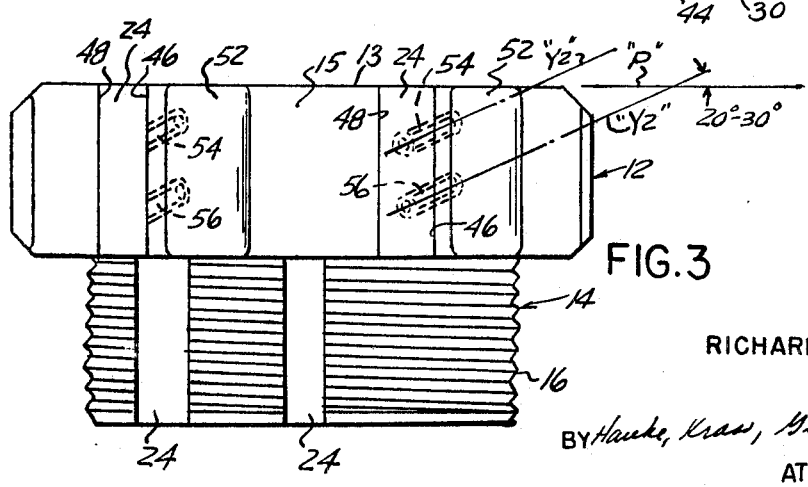
FIG. 3
INVENTOR
RICHARD LANKIN
BY Hauke, Kraus, Gifford, & Patalidis
ATTORNEYS May 5, 1970 R. LANKIN 3,509,612
MILLING CUTTER AND BLADE ASSEMBLY
Filed June 16, 1969 2 Sheets-Sheet 2
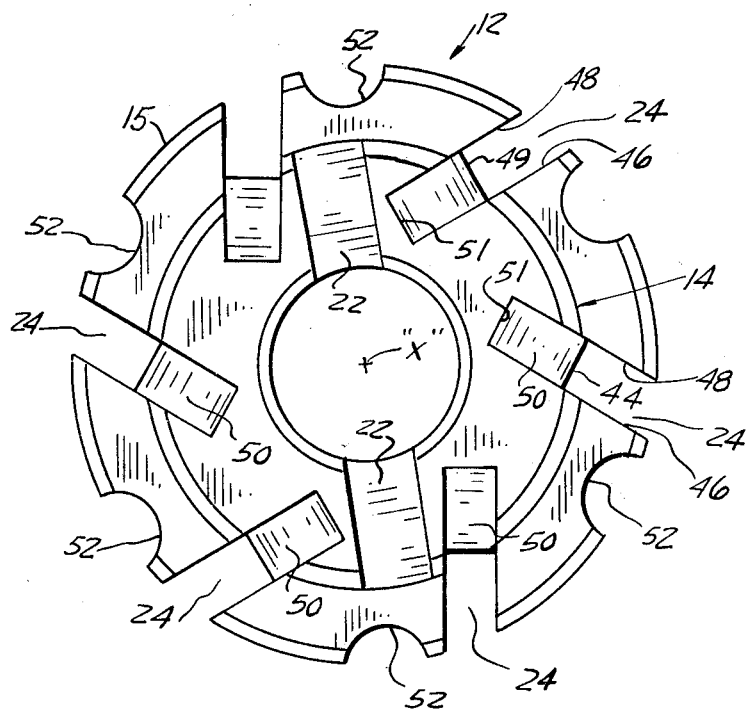
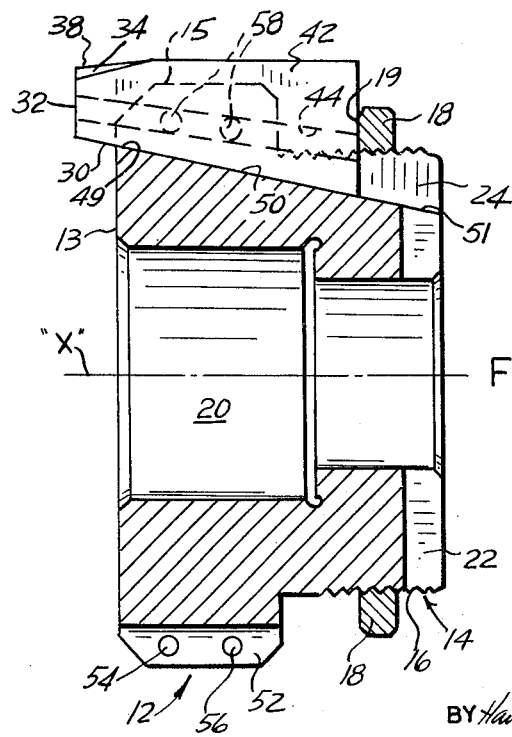
INVENTOR
RICHARD LANKIN
BY Hauk, Kras, Gifford, & Patalidis
ATTORNEYS

United States Patent Office 3,509,612
Patented May 5, 1970

3,509,612
MILLING CUTTER AND BLADE ASSEMBLY
Richard Lankin, Farmington, Mich., assignor to Borite
Manufacturing Corporation, Madison Heights, Mich.,
a corporation of Michigan
Filed June 16, 1969, Ser. No. 833,333
Int. Cl. B26d 1/12
U.S. Cl. 29—105                                      11 Claims

ABSTRACT OF THE DISCLOSURE

A milling cutter having a plurality of detachable blades attached thereto in spaced relationship with the outer surface of the cutter head provided with angularly inclined slots to receive the cutting blades, and the blades being secured in the slots by set screws inserted angularly from the outer surface of the cutter head and disposed angularly relative to the front face of the cutter head.

BACKGROUND OF THE INVENTION

Field of the invention

The present invention relates to milling cutters, and mor particularly to improved means for securing a plurality of individual cutting blades on a rototable cutter head.

DESCRIPTION OF THE PRIOR ART

Milling heads which employ a plurality of removable blades disposed in slots about the periphery of a cylindrical head are well known. The blades generally are provided with serrations which are mated with serrations in the surface of the slots in the head in order to position the blades within the slots and the blades are then secured by means of set screws, wedges or the like. It is important that the cutting edges of each of the blades extend from the head an equal distance in order for the blades to act in concert in making the cut. It is apparent that if the cutting surfaces of one of the blades extends beyond the cutting surfaces of the other blades it alone would contact the surface to be milled. Similarly, if the cutting surface of one of the blades extends from the milling head less than the cutting surfaces of the other blades it will not participate in the milling cut. For this reason, previous milling heads have included some means to maintain alignment of the blades such as an axially adjustable planar surface at the rear of the blades against which all of the blades are aligned in assembly.

In known milling cutter assemblies in which the blades are secured in slots in the cutter head by set screws, these usually extend in an angular direction from the radial surface of the cutter head towards the blade. Heretofore the angular disposition of the set screws in such cutter heads has been generally perpendicular or normal to the axis of the cutter head.

This positioning of the set screws is objectionable in that the shear forces acting on the set screws during operation of the cutter tends to cause damage to the set screw threads, causing stripping of the threads and subsequent loosening of the set screws. When this happens the set screws might require replacement and the threads in the cutter head might need retapping all at additional expense in man hours and down time. In extreme cases, an individual blade may be ejected from the head during the operation of the cutter causing possible injury to the machine operator or damage to the work or cutter head.

Similarly, the conventional connection of the blades within the slots of the cutter head by means of serrations is not satisfactory in that, after prolonged cutter operations and repeated assembly and disassembly of the blades, the serrations become worn and can cause the blades to become misaligned, which, of course, is objectionable since with misaligned blades no true and accurate cut can be made.

SUMMARY OF THE INVENTION

The present invention provides novel means of securely retaining a plurality of cutting blades in milling cutter heads in such fashion as to avoid the foregoing disadvantages of the prior art.

The cutter head of the present invention provides a main blade supporting body and a threaded hub portion of reduced diameter extending axially therefrom adapted to receive an adjustable collar for alignment of the blades in the axial direction.

The blade supporting body of the cutting head is provided on its outer surface with a plurality of longitudinal slots disposed within planes tangential to an imaginary circle and which extend into the hub portion of the cutter head. The bottoms of the slots are inclined rearwardly downwardly towards the longitudinal axis of the cutter head in conformity with the particular shape of the cutting blades so that, when the cutting blades are inserted in the slots and axially adjusted on the cutter head by the adjusting collar, radial adjustment of the blades can be achieved and the cutting edges of the blades extend from the cutter head in accurately aligned position relative to each other.

Between each pair of adjacent slots concave recesses or notches are provided circumferentially around the periphery of the cutter head. These notches are disposed closer to one slot than to the other and are each provided with a pair of parallel aligned threaded apertures extending from the notches to the closest slots. The parallel axes of apertures are disposed to intersect the center lines of the slots at an obtuse angle and to intersect the axes of the next adjacent apertures, at a central point within those apertures. The pairs of threaded apertures, in addition, are angularly disposed relative to the front face or plane of the cutter head. In assembly, the pairs of threaded apertures are adapted to receive set screws to securely retain the blades in the slots and the blades are provided longitudinally along one side with a groove adapted to receive the set screws. The grooves on the blades are disposed parallel to the inclined bottom surfaces of the slots so that the blades can be adjusted along the axis of the cutter head. The provision of the grooves in the cutting blades to be engaged by the set screws assures consistent accurate radial positioning of the cutting blades relative to the cutter head.

The provision and particular angular position of the set screws is important in that in this way any adverse shearing stresses on the set screws during operation of the cutter are eliminated since, by this construction, the created forces are primarily in the direction along the axes of the set screws instead of in a direction transverse thereto as in conventional structures.

Whenever the cutting edges of the blades are to be reground—which preferably is done in a grinding fixture accommodating all of the blades so that all of the cutting edges can be ground simultaneously to assure accurate cutting ability—the reground blades, after reassembly on the cutter head, will again be accurately aligned by appropriate axial advancement of the adjusting collar of the cutter head at the rear of the cutting blades.

Further novel features and distinct advantages will appear or be particularly pointed out in the following detailed description having reference to the accompanying drawings.

BRIEF DESCRIPTION OF THE DRAWINGS

In the drawings:
FIGURE 1 is a perspective illustration of a milling cutter head according to the present invention, showing one of the blades in position on the head;

FIGURE 1a is an enlarged perspective view of one of the cutter blades used in the cutter head shown in FIGURE 1;

FIGURE 2 is a front plan view of the cutter head and blade assembly shown in FIGURE 1 enlarged somewhat for purposes of clarity;

FIGURE 3 is a top view of the cutter head shown in FIGURE 2;

FIGURE 4 is an end view of the cutter head shown FIGURE 2; and

FIGURE 5 is a longitudinal cross section of the cutter head shown in FIGURE 2 as seen substantially along line 5—5 thereof.

DESCRIPTION OF THE PREFERRED EMBODIMENT

Referring now to the drawings, FIGURE 1 shows a milling cutter head 10 having a cylindrical blade, supporting body portion 12 which extends rearwardly into a reduced diameter hub portion 14 which is externally threaded as at 16 for the receipt of an adjustable blade alignment collar 18 (FIGURE 5). The cutter head 10 is provided with an axial bore 20 extending through both portions 12 and 14 and a lateral slot 22 (FIGURE 4) located at the end of the threaded hub portion 14 which provides the means for attaching the cutter head to a machine spindle (not shown) as is the general practice.

The cutter head 10 is provided with a plurality of annularly spaced axially extending slots 24 (six are shown in this instance) which extend from the outer surface of the blade supporting body portion 12 and the threaded hub portion 14 as particularly seen in FIGURE 5. The slots 24 are each adapted to receive an individual cutter blade 26, as shown in FIGURES 1, 2 and 5, which provide the cutting means for the cutter head.

The cutter blade 26, one of which is shown in FIGURE 1a, is of generally flat substantially rectangular shape. The rear edge 28 of the cutter blade is disposed at an angle to the bottom edge 30. The front end of the cutter blade is provided with cutting surfaces 32 and 34 having cutting edges 36 and 38 respectively, which are angularly disposed relative to each other and to the longitudinal axis of the cutter blade. The particular shape of the cutting section of the blade is of no importance in regard to the present invention, since this may vary widely depending on the type of blades used for any particular machining operation. The cutter blade 26 has opposed parallel side surfaces 40 (FIGURE 2) one of which is provided with a longitudinal groove 44 extending substantially the length of the blade parallel to the bottom edge 30. The purpose of this groove will be explained below.

The blade slots 24 in the cutter head 10 are each similarly angularly positioned along axes "Z" (FIGURE 2) which are each tangential to an imaginary circle "O" described around the central axis "X" of the cutter head. The slots are composed of opposed parallel side surfaces 46 and 48 spaced apart a distance subtantially corresponding to the thickness of the blades 26. The bottom surfaces 50 of the slots are inclined downwardly rearwardly as most clearly seen in FIGURE 5 so that the front edge 49 of the bottom surface is farther from the center axis "X" of the cutter head than is the rear edge 51 of the slots at the end of the threaded hub portion 14. Thus, upon insertion of the blades 26 in the slots, the cutting edges 36–38 will be positioned accurately relative to the work (not shown) when the rear edges 28 of the cutting blades are disposed flat against the front face 19 of the alignment collar 18. By appropriate axial adjustment of the alignment collar 18, all of the blades will be axially aligned for proper extension beyond the front surface 13 and the radial surface 15 of the body portion 12 of the head. It will be noted, particularly from FIGURE 5, that as the alignment collar 18 is axially adjusted forwardly of the cutter head, the blades 26, due to the inclined bottom surface 50 of the slots 24, will be moved outwardly of the slots to position the cutting surfaces 32 and 34 relative to the axis "X" of the cutter head. Adjustment of the blades in this manner will be necessary after every regrinding operation of the cutting surfaces 32 and 34, which, obviously, removes material from the blades.

The radial surface 15 of the body portion 12 is provided with a plurality of concave axially extending notches 52 which number is identical to the number of blade slots 24. Each of the notches 52 is disposed between a pair of adjacent blade slots and is closer to one slot than to the other. Each of the notches 52 is provided with a pair of radially angularly extending apertures 54 and 56 respectively which are parallel to each other (FIGURE 3) and which are internally threaded for the receipt of set screws 58. The paired set screw apertures 54–56, as seen in FIGURE 2, are positioned along parallel axes "Y1" which, when extended, intersect the axes of the next adjacent pair of apertures within those apertures to form a hexagonal pattern, as shown in FIGURE 2. The axes "Y1" of the set screw apertures are adapted to intersect the axes "Z" of the blade slots 24 at an obtuse angle of approximately 130 to 140 degrees, and this corresponds substantially to the direction of the cutting forces, as indicated by the arrow "C" in FIGURE 2, upon operation of the cutter head an dwhen radial cuts are taken by using the cutting edge 38. As can also best be seen in FIGURE 2 the axes "Y1" of the set screw apertures also are tangential to an imaginary circle "O" inscribed within the cutter head 12. With further reference to FIGURE 3, it will be seen that the set screw apertures 54–56 are disposed at a compound angularity, that is, they are additionally angularly offset along parallel axes "Y2" relative to the plane of the front surface 13 of the body portion 12 at an angle of between 20 and 30 degrees to the plane "P" of the front surface 13. This angle corresponds substantially to the direction of the cutting forces upon operation of the cutter head during a face cutting operation using the cutting edge 36.

Thus, during any cutting operation, the cutting forces will be directed substantially along the axes "Y1" in FIG. 2 or "Y2" in FIG. 3 of the set screws whereby the creation of damaging shear stresses on the set screws is effectively prevented.

The provision of the grooves 44 along one side surface of the blades 26, which are adapted to be engaged by the set screws 58, provides a means for effectively retaining the blades in a predetermined radial position relative to the radial surface 15 of the cutter head in any adjusted position of the blades. The wear in this arrangement is neglible even after prolonged use and repeated assembly and disassembly of the blades.

As mentioned herebefore, the cutting edges of the blades, whenever necessary, are preferably reground simultaneously by the use of a grinding fixture retaining the blades in slots corresponding to the shapes and angular disposition of the blade slots in the cutter head so that, when the blades are reassembled in the cutter head, they will have all of their cutting faces in accurate position so that each cutting edge will make an identical cut.

The present invention may be embodied in certain other forms without departing from the spirit and essential characteristics thereof, therefore the present embodiment is to be considered in all respects as illustrative only and not restrictive, the scope of the invention being indicated by the appended claims rather than by the foregoing description.

I claim:

1. In combination, a milling cutter and blade assembly comprising a cylindrical milling head having a central axis and composed of a blade supporting portion and an externally threaded portion adjacent thereto, said milling head being provided with a plurality of radial slots disposed angularly in relation to the axis of said milling head and extending through both said head portions, a plurality of notches provided in the radial surface of said blade supporting portion, each of said notches being disposed between a pair of said slots; the combination comprising:

- a plurality of cutting blades each of which is adapted to be inserted in one of said slots to be supported therein,
- each of said notches being provided with at least one threaded aperture opening into said slots,
- each of said threaded apertures being disposed in a first angular position along an axis tangential to an imaginary circle inscribed within said head,
- each of said threaded apertures being disposed in a second angular position along an axis intersecting a plane containing the front surface of said head, and
- set screws disposed within said threaded apertures to secure said blades within said slots.

2. In the combination defined in claim 1, in which each of said blades is provided with a longitudinal groove along one side thereof adapted to be lockingly engaged in assembly by said set screws.

3. In the combination defined in claim 2 in which each of said notches is provided with a pair of threaded apertures disposed along parallel axes, each of said apertures receiving a set screw adapted for locking engagement within said longitudinal grooves of said blades.

4. In the combination defined in claim 1, in which said first angular position of said threaded apertures is in a direction substantially coinciding with the direction of the radial cutting forces and said second angular position is in a direction substantially coinciding with the direction of the lateral cutting forces when said milling cutter is in operation.

5. In the combination defined in claim 1, in which said threaded portion is adapted to receive an axially adjustable alignment collar adapted for axial and radial alignment of said blades in said slots.

6. A milling head adapted to support a plurality of cutting blades comprised of:

- a large diameter blade supporting portion and a smaller diameter threaded portion,
- a plurality of slots disposed in the radial surface of said milling head, said slots being equally angularly spaced circumferentially around said radial surface,
- each of said slots having an axis angularly disposed relative to said radial surface and having a bottom surface angularly, rearwardly inclined,
- a plurality of notches disposed in the radial surface of said blade supporting portion, said notches being spaced equiangularly therearound between said slots,
- at least one threaded aperture disposed in each of said notches for intersection with said slots,
- each of said threaded apertures being disposed angularly along axes which intersect the axis of the next adjacent threaded aperture within said next adjacent threaded aperture.

7. A milling head as defined in claim 6, in which said axes of said threaded apertures intersect to form a polygonal pattern inscribed within the circumference of said large diameter blade supporting portion.

8. A milling head as defined in claim 6, in which said axes of said threaded apertures intersect said axis of said slots at any angle of between 130 to 140 degrees.

9. A milling head as defined in claim 6, in which said axes of said threaded apertures are further angularly disposed relative to the front surface of said milling head.

10. A milling head as defined in claim 9, in which said axes of said threaded apertures are disposed at an angle of from 20 to 30 degrees and intersect a plane containing said front surface of said milling head.

11. A milling head as defined in claim 6, in which pairs of threaded apertures are provided in each of said notches and are disposed along axes parallel to each other.

References Cited

UNITED STATES PATENTS

| | | | |
|---|---|---|---|
| 602,039 | 4/1898 | Smith | 29—105 |
| 1,300,158 | 4/1919 | Geitner | 29—105 |
| 2,415,136 | 2/1947 | Jerome | 29—105 |
| 2,420,057 | 5/1947 | Steffes | 29—105 |

HARRISON L. HINSON, Primary Examiner

UNITED STATES PATENT OFFICE
CERTIFICATE OF CORRECTION

Patent No. 3,509,612      Dated May 5, 1970

Inventor(s) Richard Lankin

It is certified that error appears in the above-identified patent and that said Letters Patent are hereby corrected as shown below:

Column 2, line 36, after "adjacent" insert --pair of--

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents